(12) United States Patent
Lu

(10) Patent No.: US 11,494,305 B2
(45) Date of Patent: Nov. 8, 2022

(54) LINKED LIST SEARCHING METHOD AND LINKED LIST SEARCHING DEVICE

(71) Applicant: REALTEK SEMICONDUCTOR CORPORATION, Hsinchu (TW)

(72) Inventor: Yen-Ju Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/236,980

(22) Filed: Apr. 21, 2021

(65) Prior Publication Data
US 2022/0269608 A1 Aug. 25, 2022

(30) Foreign Application Priority Data
Feb. 20, 2021 (TW) ................. 110105985

(51) Int. Cl.
*G06F 12/0815* (2016.01)
*G06F 16/901* (2019.01)
(52) U.S. Cl.
CPC ...... *G06F 12/0815* (2013.01); *G06F 16/9027* (2019.01); *G06F 2212/1041* (2013.01)
(58) Field of Classification Search
None
See application file for complete search history.

(56) References Cited

U.S. PATENT DOCUMENTS

| 7,035,988 B1 | 4/2006 | Marino | |
| 10,055,150 B1* | 8/2018 | Fenol | G06F 12/0868 |
| 10,146,438 B1* | 12/2018 | Shilane | G06F 3/0688 |
| 2017/0277638 A1* | 9/2017 | Busayarat | G06F 12/0864 |
| 2019/0258561 A1* | 8/2019 | Loteanu | G06F 16/9024 |
| 2021/0303480 A1* | 9/2021 | Keller | G06F 12/0824 |

FOREIGN PATENT DOCUMENTS

| TW | 556077 B | 10/2003 |
| TW | 580619 B | 3/2004 |
| TW | 200912643 A | 3/2009 |

OTHER PUBLICATIONS

English Abstract Translation of 556077, TW580619B and TW200912643A.

\* cited by examiner

*Primary Examiner* — Kaushikkumar M Patel
(74) *Attorney, Agent, or Firm* — WPAT, P.C., Intellectual Property Attorneys; Anthony King

(57) ABSTRACT

A linked list searching method and device are configured to search a linked list by using a cache memory. The method includes the operations of: writing the linked list in a memory; writing the data of a first node in a first row of a tag memory of the cache memory, and writing an address of the first node in a first row of a data memory of the cache memory; writing the data of a second node in a second row of the tag memory, and writing the address of the second node in a second row of the data memory; and searching the data of the second node in the tag memory to directly retrieve the address of the second node when searching the address of the second node in the linked list according to the data of the second node.

20 Claims, 5 Drawing Sheets

LINKED LIST SEARCHING METHOD AND LINKED LIST SEARCHING DEVICE

CROSS-REFERENCE TO RELATED APPLICATIONS

This application claims the benefit of priority to Patent Application No. 110105985, filed in Taiwan on Feb. 20, 2021, which is incorporated by reference in its entirety.

TECHNICAL FIELD

The present application is related to a data search method; in particular, to a linked list searching method and a linked list searching device

BACKGROUND

A link list includes multiple nodes for storing data, wherein in addition to storing data, each node also includes a pointer that indicates the address of the next node. Because of the link list's characteristics as mentioned above, when adding or deleting nodes, the link list only needs to modify the pointers in the nodes before and after the added/deleted node, without changing the position of the original existing nodes in the memory. Therefore, link lists are convenient for storing dynamic data. However, when searching for nodes in the linked list, the searching must be performed based on the list built by the pointers in the nodes. When the linked list includes more nodes, the above search operation not only consumes more computing time of the processor but also more power, resulting in low performance. Therefore, how to quickly search for the target node in the link list has become one of the critical issues in this field.

SUMMARY OF THE INVENTION

An aspect of the present disclosure provide a linked list searching method configured to search a linked list using a cache memory. The linked list searching method includes the operations of: writing the linked list in a memory, wherein the linked list comprises a first node and a second node, wherein both the first node and the second node have a data and a pointer, and the pointer of the first node indicates an address of the second node; writing the data of the first node in a first row of a tag memory of the cache memory, and writing an address of the first node in a first row of a data memory of the cache memory, wherein the first row of the tag memory corresponds to the first row of the data memory; writing the data of the second node in a second row of the tag memory, and writing the address of the second node in a second row of the data memory, wherein the second row of the tag memory corresponds to the second row of the data memory; and searching the data of the second node in the tag memory to directly retrieve the address of the second node when searching the address of the second node in the linked list according to the data of the second node.

Another aspect of the present disclosure provide a linked list searching device including a memory, a processor, a writing unit, and a search unit. The memory is configured to store a linked list. The linked list includes a first node and a second node. Both the first node and the second node have a data and a pointer, and the pointer of the first node indicates an address of the second node. The processor is coupled to the memory and configured to write the linked list in the memory. The writing unit is coupled to the processor and a cache memory. The cache memory includes a tag memory and a data memory. The writing unit is configured to respectively write the data of the first node and the data of the second node in a first row and a second row of the tag memory, and write the address of the first node and the address of the second node in a first row and a second row of the data memory. The search unit is coupled to the processor and the cache memory and configured to search the data of the second node in the tag memory to directly retrieve the address of the second node when searching the address of the second node in the linked list according to the data of the second node.

Compared with the conventional art, the linked list searching method and device according to the present disclosure uses a cache memory (may be outside the processor) to assist the search operation of the linked list, thereby improving the overall search speed.

BRIEF DESCRIPTION OF THE DRAWINGS

Aspects of the present disclosure are best understood from the following detailed description when read with the accompanying drawings. It is noted that, in accordance with the standard practice in the industry, various features are not drawn to scale. In fact, the dimensions of some features may be arbitrarily increased or reduced for clarity of discussion.

DETAILED DESCRIPTION

Figure 1:
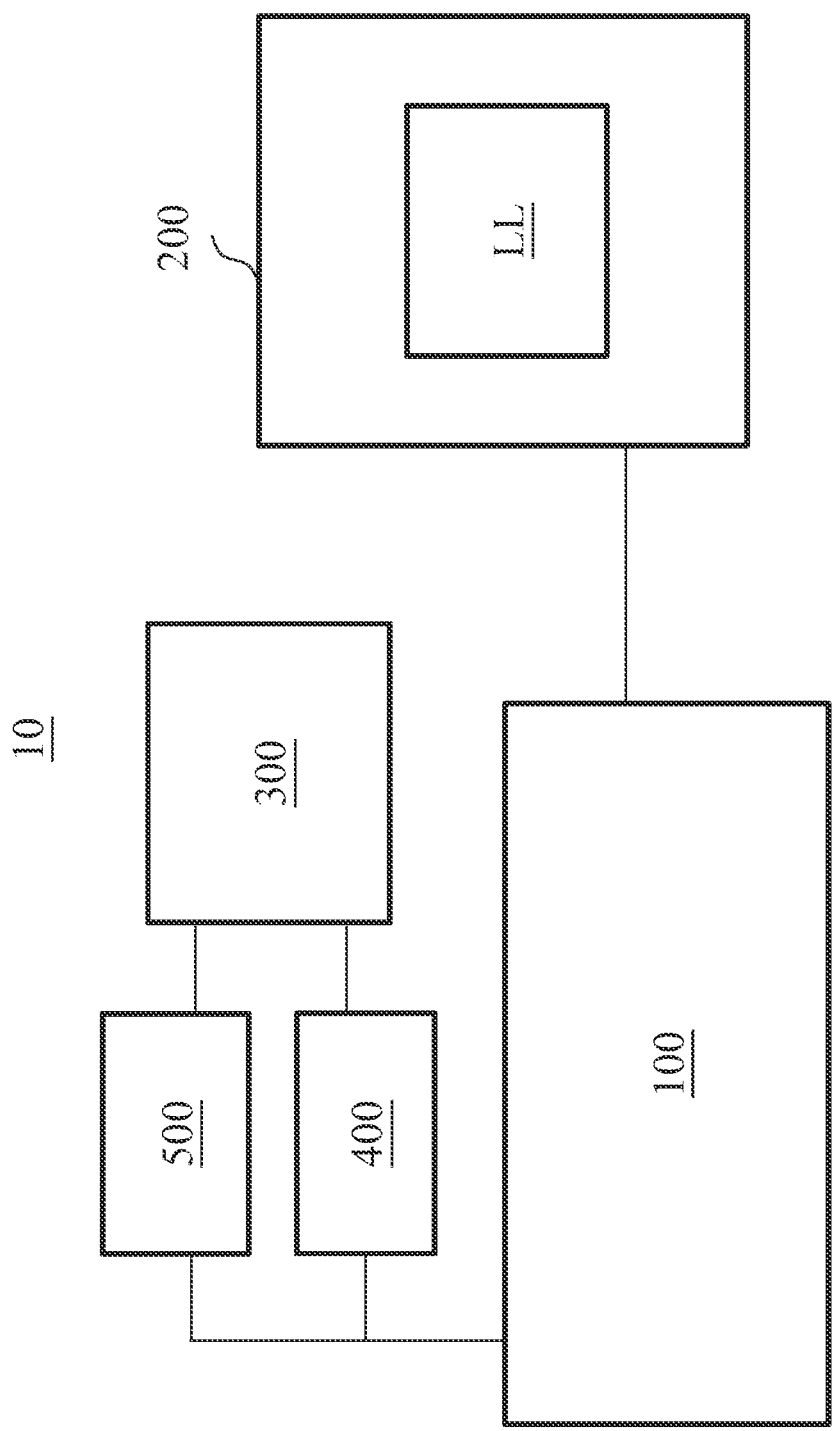
FIG. 1 is a schematic diagram illustrating a linked list searching device according to some embodiments of the present application.

FIG. 1 is a schematic diagram illustrating a linked list searching device 10 according to some embodiments of the present application. The linked list searching device 10 includes a processor 100, a memory 200, a cache memory 300, a search unit 400, and a writing unit 500. As shown in FIG. 1, the memory 200, the search unit 400, and the writing unit 500 are respectively coupled to the processor 100, and the cache memory 300 is coupled to the search unit 400 and the writing unit 500. In some embodiments, the processor 100 (e.g., a central processing unit (CPU)) includes other cache memories. In some embodiments, the cache memory 300 is a cache memory 300 outside the processor 100; however, the present disclosure is not limited thereto and can use a cache memory built in the processor as the cache memory 300.

Figure 2:
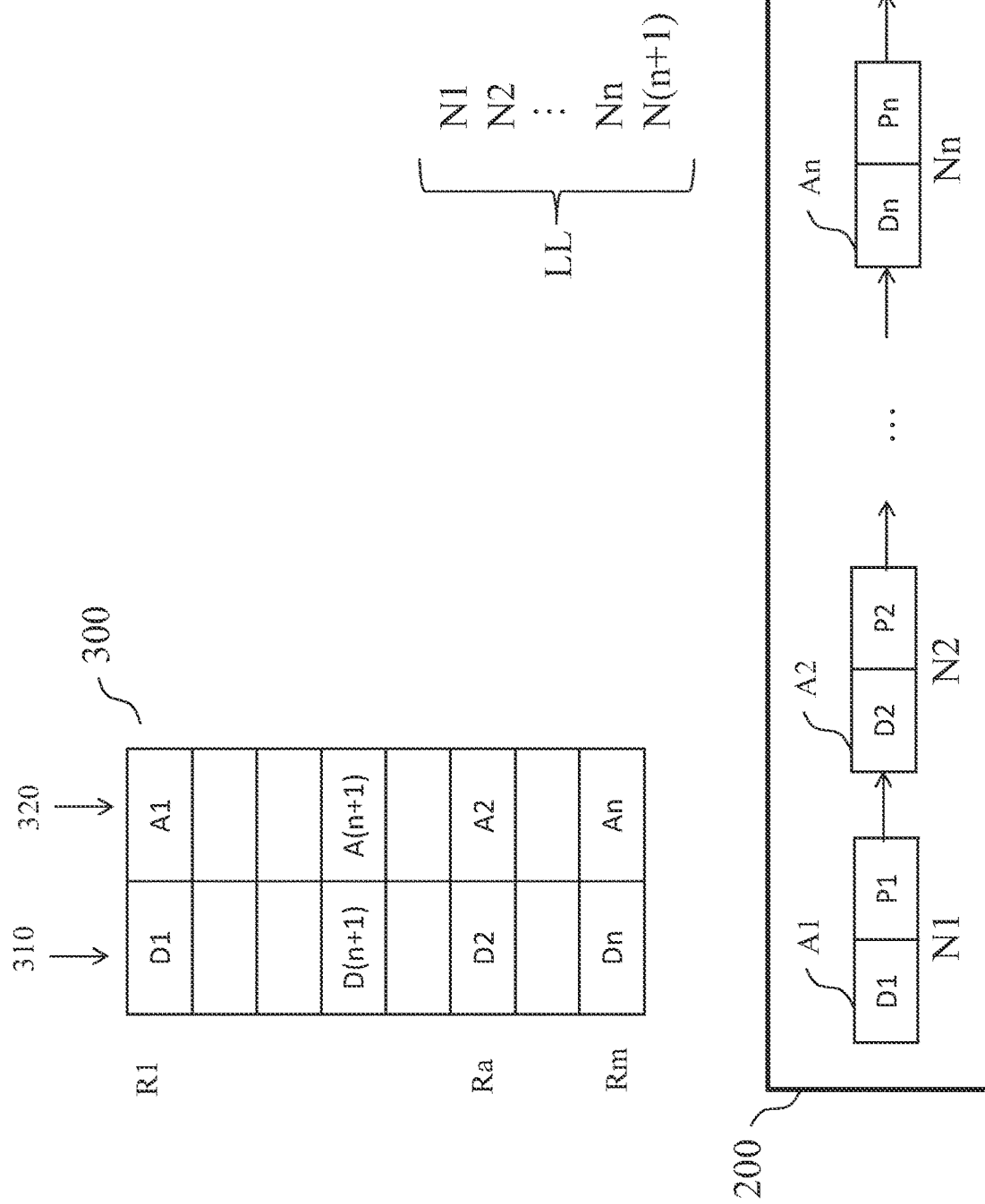
FIG. 2 is a schematic diagram illustrating a linked list in a cache memory according to some embodiments of the present application.

The processor 100 is configured to create a linked list LL in the memory 200. Reference is also made to FIG. 2. At the lower part of FIG. 2, the linked list LL of the memory 200 includes multiple nodes, such as the node N1, node N2 to node Nn and node N(n+1), each node respectively corresponds to data D1 to data D(n+1) and pointer P1 to pointer P(n+1) (each node corresponds to one data and one pointer, respectively). The processor 100 is configured to respectively write data D1 to data D(n+1) in address A1 to address A(n+1) of the memory 200 and point the pointer P1 of the node N1 to the address A2 of the node N2, and point the pointer P2 of the node N2 to the address A3 of the node N3, and so on and so forth for the node N3 to node Nn, so that the above-mentioned linked list LL is formed according to the pointed connection among the node N1 to N(n+1). According to this pointed relationship, if one aims to search for a particular node in the linked list LL (say, node N100), the conventional approach uses the processor to search the node in the linked list LL one by one according to the order of nodes in the memory 200, starting from node N1, until it reaches the node N100. In contrast, the linked list searching device 10 according to embodiments of the present disclosure may first use the writing unit 500 to write the data and address of the node of the linked list LL in the cache memory 300, and when the processor 100 aims to search for a particular node in the linked list LL of the memory 200, the linked list searching device 10 uses the search unit 400 to find the data of the target node in the cache memory 300 and then retrieves the address correspondingly, so that the processor 100 may access the target node of the linked list LL of the memory 200 according to the address. This search operation may increase the operation speed and reduce the power consumption. A detailed discussion is provided below.

The upper part of FIG. 2 illustrates the segment of the cache memory 300 that is used as the tag memory (tag RAM) 310 and the segment that is used as the data memory (data RAM) 320; however, not all segments of the cache memory 300 are used as the tag or data memory. When the processor 100 creates the linked list LL in the memory 200, the writing unit 500 is configured to write the data D1 to the data D(n+1) and write the address A1 to the address A(n+1) in the cache memory 300. As shown in FIG. 2, the writing unit 500 respectively writes the data D1 to the data (Dn+1) and the address A1 to the address (An+1) in segment of the tag memory 310 and the segment of the data memory 320.

In some embodiments, when the processor 100 adds a node to the linked list LL, the writing unit 500 writes the data and the address of the newly added node in the tag memory 310 and the data memory 320 of the cache memory 300. In some embodiments, when the processor 100 deletes a node from the linked list LL, the writing unit 500 deletes the data and the address stored in the cache memory 300 corresponding to the deleted node. In other words, when the processor 100 adds or deletes the nodes in the linked list LL, the writing unit 500 will also add or delete the data and the address of the added or deleted nodes in the cache memory 300 correspondingly.

In some embodiments, the tag memory 310 and the data memory 320 both have multiple rows, such as the row R1, row R2 to row Rm, and the row R1, row R2 to row Rm in the tag memory 310 respectively correspond to the row R1, row R2 to row Rm of the data memory 320 (i.e., the corresponding relationship of the rows shown in FIG. 2). The writing unit 500 writes the data D1 to data D(n+1) and the address A1 to address A(n+1) in the row R1, row R2 to row Rm of the tag memory 310 and the row R1, row R2 to row Rm of the data memory 320. For example, the data D1 and address A1 of the node N1 are respectively written in the row R1 of the tag memory 310 and the data memory 320, the data D2 and the address A2 of the node N2 are respectively written in the row Ra of the tag memory 310 and the data memory 320, and the data Dn and the address An of the node Nn are respectively written in the row Rm of the tag memory 310 and the data memory 320. Therefore, the node N1, node N2, and node Nn may respectively correspond to the row R1, row Ra, and row Rm of the tag memory 310 and the data memory 320. As could be appreciated, FIG. 2 is only a schematic diagram configured to depict the corresponding relationship between the data and the address, physical distributions of the segment of the tag memory 310 and the segment of the data memory 320 in the cache memory 300 may not be as shown necessarily.

When the processor 100 intends to access the node Nn, the search unit 400 is configured to search the cache memory 300 for the row corresponding to the node Nn (i.e., the row Rm shown in FIG. 2) to retrieve the address An associated with the node Nn, so that the processor 100 may access the node Nn in the memory 200 according to address An.

Specifically, in some embodiments, the processor 100 transmits the data Dn of the node Nn to the search unit 400, and the search unit 400 sequentially search whether there is a row matching the data Dn in the tag memory 310 of the cache memory 300. In the embodiment shown in FIG. 2, when the search unit 400 searches from the row R1 to the row Rm and determines that the data stored in the row Rm of the tag memory 310 is identical to the data Dn, it is determined that the comparison is a cache hit. Next, the search unit 400 retrieves the address An stored in the row Rm from the data memory 320, and transmits the retrieved address An to the processor 100, so that the processor may access the node Nn according to the address An.

In some embodiments, the writing unit 500 first categorizes the data D1 to data D(n+1) and then writes the same in the tag memory 310. Specifically, take the data D1 for example, the writing unit 500 divides the data D1 by a classification factor to obtain a remainder, wherein the classification factor is an integer greater than 1. Next, the writing unit 500 selects the row in the tag memory 310 for writing according to the calculated remainder. In some embodiments, the value X of the classification factor is equal to the number of the rows of the tag memory 310 and the data memory 320 (that is, m=10, and the row Rm is row R10). Therefore, when the writing unit 500 is computing for the remainder, there are X kinds of different remainders at most, and these remainders can be assigned one-to-one to X rows. For example, the data Dn of the node Nn is 90, the number of rows of the tag memory 310 and the data memory 320 is 10, and the writing unit 500 divides 90 by 10 to obtain a remainder of 0. Then, the writing unit 500 corresponds the remainder 0 to the row Rm (R10) of the tag memory 310 and the data memory 320, and then writes the data Dn of 90 data in the row Rm of the tag memory 310 and writes the address An of the node Nn in the row Rm of the data memory 320.

In some other embodiments, the number of rows in the tag memory 310 and the data memory 320 is a power of 2. In this way, when the writing unit 500 computes the remainder of the data D1 to D(n+1), only the least significant bits (LSB) of the data D1 to D(n+1) are taken as the remainder, and no additional division computation is required. For example, the number of rows in the tag memory 310 and the data memory 320 is 32 ($2^5$), and the writing unit 500 takes the last 5 bits of the data D1 to D(n+1) as the remainder.

In some embodiments, each row in the tag memory 310 and the data memory 320 only stores the data and the address of a single node. For example, when different data (such as, data D5 and data D7 (not shown in FIG. 2, for discussion purposes only)) have the same remainder of 5, the writing unit 500 overwrites the data D5 with the data D7 in the row R5 of the tag memory 310 and overwrites the address A5 with the address A7 in the row R5 of the data memory 320.

In some embodiments, when searching for node N2, the processor 100 transmits the data D2 to the search unit 400, the search unit 400 then divides the data D2 by the classification factor to obtain a remainder and then compare the corresponding row Ra and data D2 in the tag memory 310 according to remainder. When the data D2 is the same as the corresponding row R in the tag memory 310, the search unit 400 retrieves the address A2 stored in the row Ra of the data memory 320. The processor 100 then accesses the node N2 according to the retrieved address A2.

Figure 3:
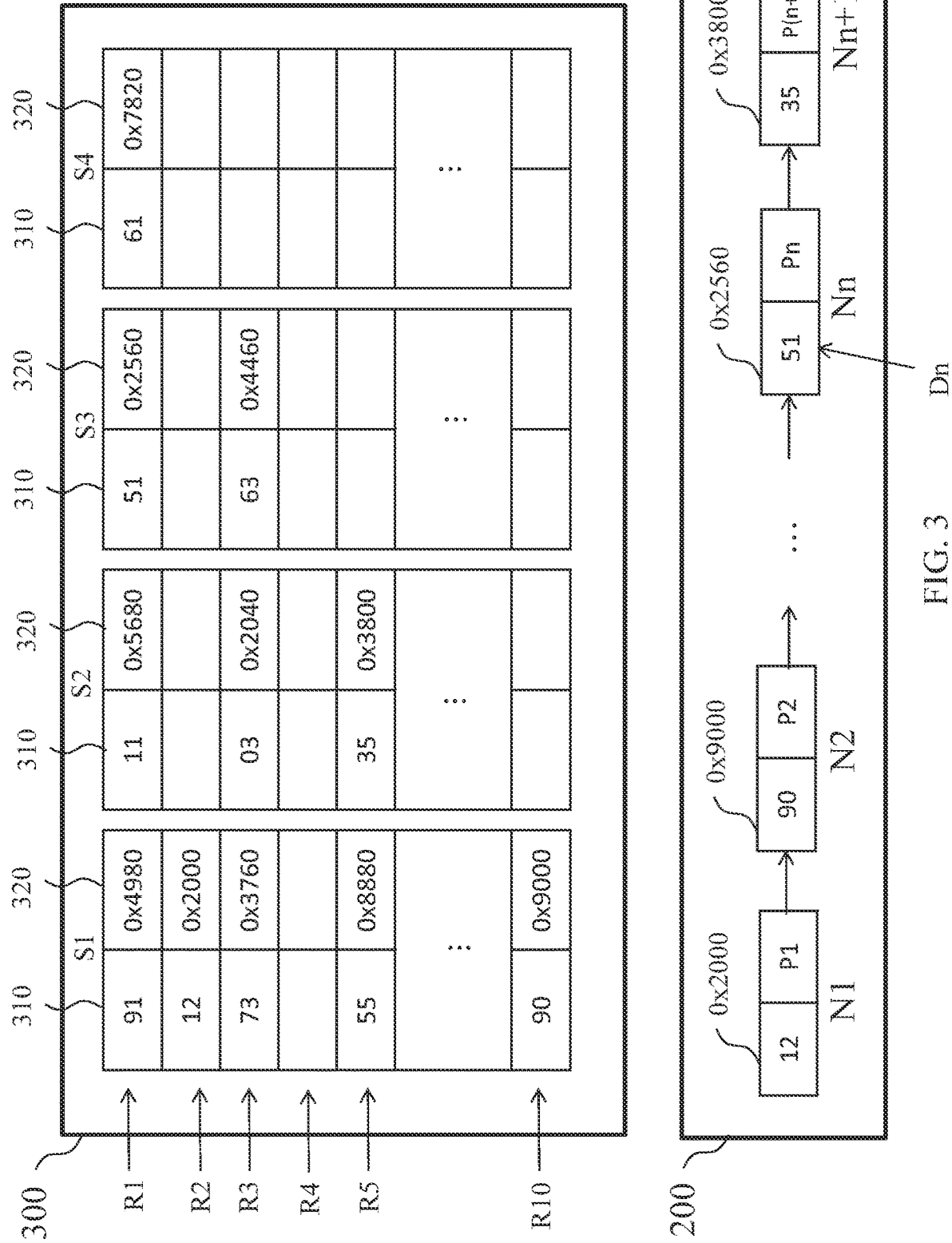
FIG. 3 is a schematic diagram illustrating a linked list in a cache memory according to some other embodiments of the present application.

In some embodiments, each row of the tag memory 310 and the data memory 320 may store the data and address of multiple nodes. As shown in FIG. 3, the segment of each row of the tag memory 310 and the data memory 320 in the cache memory 300 includes four sets S1 to S4. In a set corresponding to one row, each of sets S1 to S4 may respectively store the data and address of one node. In other words, each row of the tag memory 310 and the data memory 320 may store the data and address of four nodes.

In the embodiment of FIG. 3, when the writing unit 500 writes the data D1 to D(n+1) of the node N1 to N(n+1) in the tag memory 310, the writing unit 500 divides the data D1 to D(n+1) by the classification factor to obtain a remainder, and then writes the data D1 to D(n+1) in the tag memory 310 and the data memory 320 according to remainder corresponding to the row of the tag memory 310. Take the embodiment of FIG. 3 for example, there are three nodes (nodes having the data of 73, 03, and 63) having a remainder of 3 (divided by 10) in the data D1 to D(n+1), which are respectively written in the set S1, S2 and S3 of the row R3 in the tag memory 310, and the addresses thereof (0×3760, 0×2040, and 0×4460) are respectively written in the set S1, S2 and S3 of the row R3 in the data memory 320.

Figure 4:
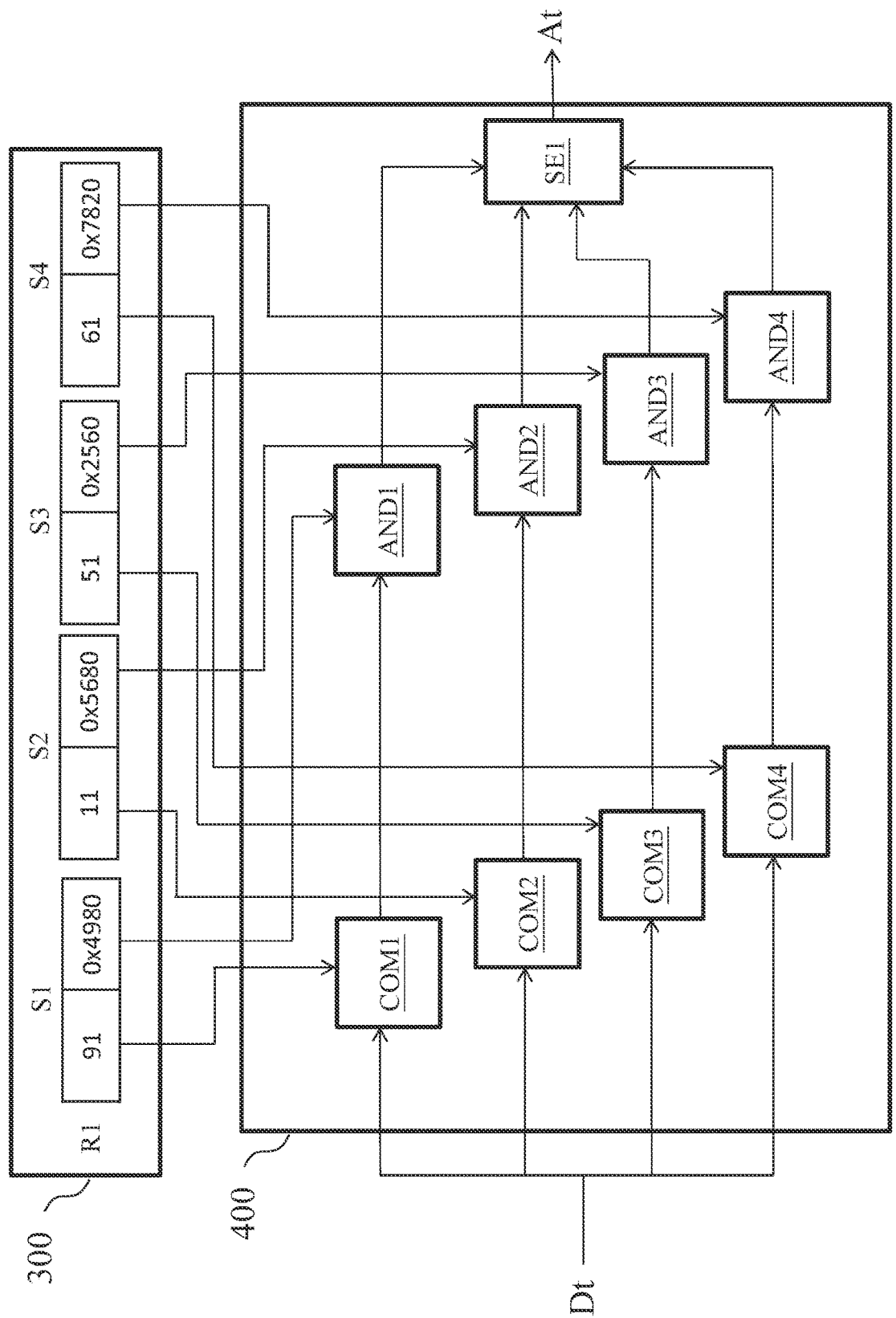
FIG. 4 is a schematic diagram showing the operation of a search unit according to some embodiments of the present application.

Reference is also made to FIG. 4. FIG. 4 is a schematic diagram showing the operation of the search unit 400 according to some embodiments of the present application. Before the processor 100 intends to access the target node Nt (not shown in FIG. 4, for discussion purposes only), the target data Dt of the target node Nt is transmitted to the search unit 400, so that the search unit 400 retrieves a target address At of the target node Nt in the cache memory 300 according to the target data Dt and then transmits the same to the processor 100. The processor 100 then accesses the target node Nt in the memory 200 according to the target address At.

The search unit 400 includes comparators COM1 to COM4, logic gates AND1 to AND4, and a selector SE1. The comparators COM1 to COM4 are configured to receive the target data Dt transmitted from the processor 100 and are respectively coupled to sets S1 to S4 of the tag memory 310 in the cache memory 300. Reference is made to both FIG. 3 and FIG. 4. For example, if the target data Dt is the data Dn of the node Nn (as shown in FIG. 3, the value of the data Dn is 51), the search unit 400 divides the data Dn (value: 51) by a classification factor (row number: 10) to obtain a remainder (value: 1). Therefore, the search unit 400 can compare the sets S1 to S4 of row R1 that corresponds to the remainder of 1 in the target data Dt and the tag memory 310. The comparators COM1 to COM4 are respectively configured to compare the set S1 to S4 of the row R1 in the target data Dt and the tag memory 310 and output the comparison results to the logic gates AND1 to AND4. The logic gates AND1 to AND4 respectively perform the AND logic operations on the comparison results and the sets S1 to S4 of the row R1 in the data memory to output a logic operation results. The selector SE1 then selects the logic operation result of one of the logic gates AND1 to AND4 and outputs it as the target address At.

Since the data Dt is identical to the value (the value of Dn is 51) in the set S3 of the row R1 in the tag memory 310, the comparator COM3 outputs a comparison result indicating a cache hit. Then the logic gate AND3 performs an AND logic operation on the comparison result output by the comparator COM3 and the set S3 of the two R1 in the data memory 320 (address An with the value 0×2560) to output the address An as the target address At and transmits it to the processor 100.

In some embodiments, the selector SE1 is implemented by an OR gate. In some other embodiments, the selector SE1 is implemented by a multiplexer (MUX).

The configurations of the search unit 400 are for illustration purposes only, and the present application is not limited thereto. For example, in other embodiments, the search unit 400 is substituted by the search unit 600 shown in FIG. 5.

Figure 5:
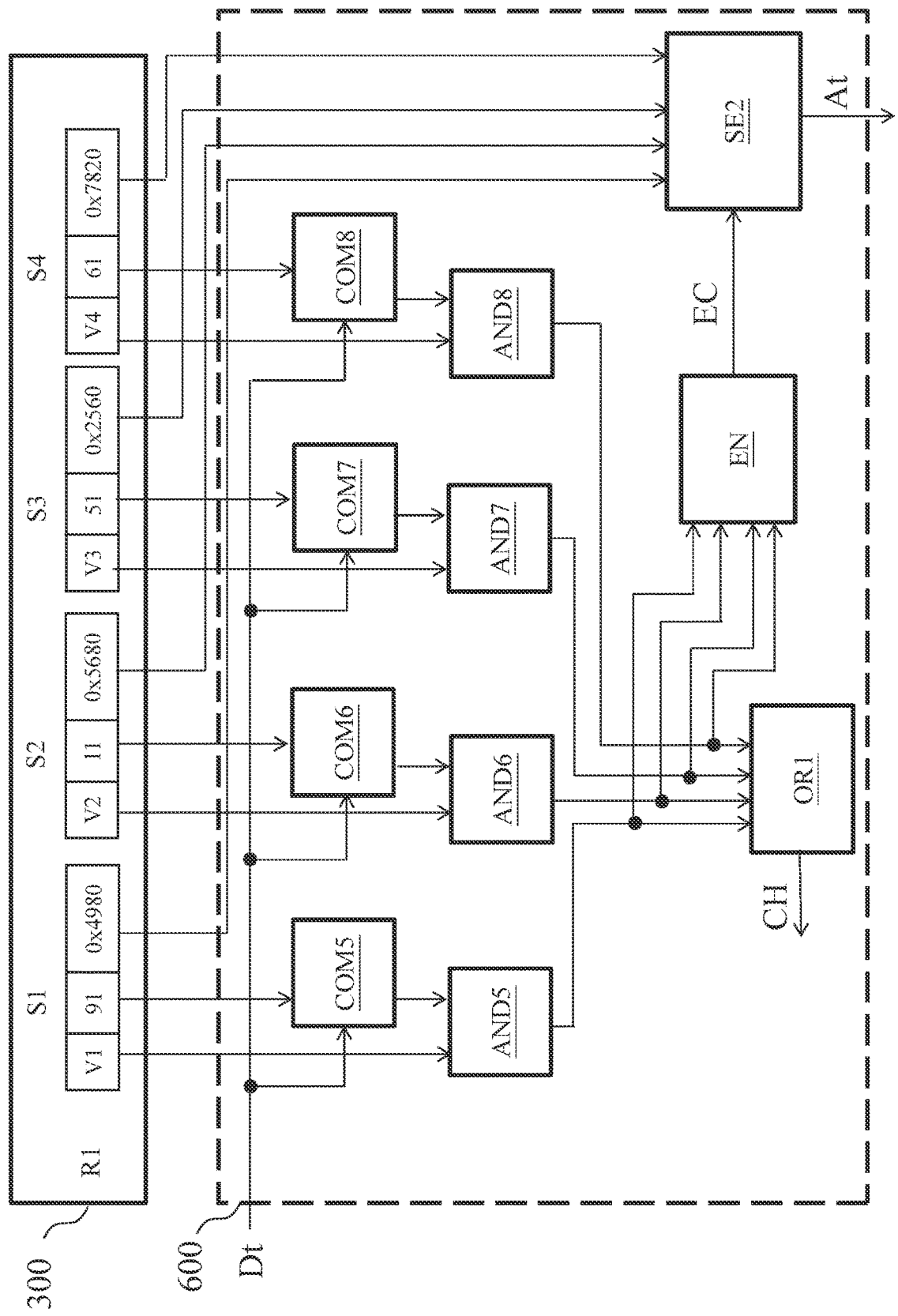
FIG. 5 is a schematic diagram showing the operation of a search unit according to some other embodiments of the present application.

Reference is made to both FIG. 3 and FIG. 5. FIG. 5 is a schematic diagram showing the operation of a search unit 600 in the cache memory 300 of FIG. 3 according to some other embodiments of the present application. The search unit 600 includes comparators COM5 to COM8, logic gates AND5 to AND8, a logic gate OR1, an encoder EN, and a selector SE2. The comparators COM5 to COM8 are configured to receive the target data Dt transmitted from the processor 100 and are respectively coupled to sets S1 to S4 of the tag memory 310 in the cache memory 300. For example, if the target data Dt is the data Dn of the node Nn (as shown in FIG. 3, the value of the data Dn is 51), the search unit 900 divides the data Dn (value: 51) by a classification factor (row number: 10) to obtain a remainder (value: 1). Therefore, the search unit 600 can compare the sets S1 to S4 of row R1 that corresponds to the remainder of 1 in the target data Dt and the tag memory 310. The comparators COM5 to COM8 are respectively configured to compare the set S1 to S4 of the row R1 in the target data Dt and the tag memory 310 and output the comparison results to the logic gates AND5 to AND8. In this embodiment, each set of each row in the cache memory 300 further includes a valid pointer memory, such as V1 to V4 of FIG. 5. The valid pointer memory V1 to V4 are configured to indicate whether the corresponding sets S1 to S4 are validly written. For example, when the set S1 of the row R1 is validly written, then the value of the valid pointer memory V1 is updated as 1. The logic gates AND5 to AND8 respectively perform the AND logic operations on the comparison results and the corresponding valid pointer memory V1 to V4 to output logic operation results. The logic gate OR1 then perform the OR logic operations on the outputted logic operation results. When one of the logic gates AND5 to AND8 outputs an operation result of cache hit, the logic gate OR1 is configured to output a signal CH indicating the cache hit. On the other hand, the encoder EN encodes the logic operation results outputted by the logic gates AND5 to AND8 and generates an encoded signal EC to the selector SE2. The encoded signal EC is configured to indicate which set (S1 to S4) of the row R1 in the cache memory 300 is indicated as cache hit. The selector SE2 than selects the set (in this case, set S3) corresponds to the data memory 320 in the data memory 320 and outputs it as the target address At according to the encoded signal EC.

What is claimed is:

1. A linked list searching method, configured to search a linked list using a cache memory, comprising:
writing the linked list in a memory, wherein the linked list comprises a first node and a second node, wherein both the first node and the second node have a data and a pointer, and the pointer of the first node indicates an address of the second node;

dividing the data of the first node by a classification factor to obtain a first remainder;

dividing the data of the second node by the classification factor to obtain a second remainder;

according to the first remainder, writing the data of the first node in a first row of a tag memory of the cache memory, and writing an address of the first node in a first row of a data memory of the cache memory, wherein the first row of the tag memory corresponds to the first row of the data memory;

according to the second remainder, writing the data of the second node in a second row of the tag memory, and writing the address of the second node in a second row of the data memory, wherein the second row of the tag memory corresponds to the second row of the data memory; and searching the data of the second node in the tag memory to directly retrieve the address of the second node when searching the address of the second node in the linked list according to the data of the second node.

2. The linked list searching method of claim 1, wherein the step of searching the data of the second node in the tag memory to directly retrieve the address of the second node comprises:

sequentially comparing whether the data of the second node is identical to the first row and the second row of the tag memory; and retrieving the address of the second node from the second row of the data memory when the second row of the tag memory is identical to the data of the second node.

3. The linked list searching method of claim 2, wherein the step of searching the data of the second node in the tag memory to directly retrieve the address of the second node further comprises:

accessing the second node according to the address of the second node.

4. The linked list searching method of claim 1, wherein the linked list further comprises a third node, wherein the third node has a data and a pointer, and the pointer of the second node indicates an address of the third node, wherein the linked list searching method further comprises:

dividing the data of the third node by the classification factor to obtain a third remainder;

writing the data of the third node in the first row of the tag memory and writing the address of the third node in the first row of the data memory, when the first remainder is equal to the third remainder;

writing the data of the third node in the second row of the tag memory and writing the address of the third node in the second row of the data memory, when the third remainder is equal to the second remainder; and writing the data of the third node in a third row of the tag memory, and writing the address of the third node in a third row of the data memory, when the third remainder, the first remainder, and the second remainder are different to each other, wherein the first remainder is different from the second remainder.

5. The linked list searching method of claim 4, wherein the steps of writing the data of the third node in the first row of the tag memory and writing the address of the third node in the first row of the data memory comprise:

using the data of the third node to overwrite the data of the first node on the first row of the tag memory; and using the address of the third node to overwrite the address of the first node on the first row of the data memory.

6. The linked list searching method of claim 4, wherein the steps of writing the data of the second node in the second row of the tag memory of the cache memory and writing the address of the second node in the second row of the data memory of the cache memory comprise:

writing the data of the second node in a first set of the second row of the tag memory of the cache memory, and writing the address of the second node in a first set of the second row of the data memory of the cache memory; wherein the step of writing the data of the third node in the second row of the tag memory and writing the address of the third node in the second row of the data memory comprise:

writing the data of the third node in a second set of the second row of the tag memory of the cache memory and writing the address of the third node in a second set of the second row of the data memory of the cache memory.

7. The linked list searching method of claim 6, wherein the step of searching the data of the second node in the tag memory to directly retrieve the address of the second node comprises:

comparing whether the data of the second node is identical to the first set and the second set of the second row of the tag memory; and retrieving the address of the second node from the first set of the second row of the data memory, when the first set of the second row of the tag memory and the data of the second node are identical.

8. The linked list searching method of claim 1, wherein the number of rows of the tag memory and the data memory is equal to the value of the classification factor.

9. The linked list searching method of claim 1, further comprising:

adding a third node in the linked list, wherein the third node has a data; and writing the data of the third node in a third row of the tag memory, and writing the address of the third node in a third row of the data memory.

10. The linked list searching method of claim 1, further comprising:

deleting the second node from the linked list; and erasing the second row of the tag memory, and cleaning the second row of the data memory.

11. A linked list searching device, comprising, a memory, configured to store a linked list, wherein the linked list comprises a first node and a second node, wherein both the first node and the second node have a data and a pointer, and the pointer of the first node indicates an address of the second node;

a processor, coupled to the memory and configured to write the linked list in the memory;

a writing unit, coupled to the processor and a cache memory, wherein the cache memory comprises a tag memory and a data memory, and the writing unit is configured to respectively dividing the data of the first node and the data of the second node by a classification factor to obtain a first remainder and a second remainder, write the data of the first node according to the first remainder and the data of the second node according to the second remainder in a first row and a second row of the tag memory, and write the address of the first node and the address of the second node in a first row and a second row of the data memory; and a search unit, coupled to the processor and the cache memory and configured to search the data of the second node in the tag memory to directly retrieve the address of the second node when searching the address of the second node in the linked list according to the data of the second node.

12. The linked list searching device of claim 11, wherein the search unit is further configured to sequentially compare whether the data of the second node is identical to the first row and the second row of the tag memory, wherein when the second row of the tag memory and the data of the second node are identical, and the search unit is configured to retrieve the address of the second node from the second row of the data memory.

13. The linked list searching device of claim 12, wherein the search unit is configured to transmit the address of the second node to the processor, wherein the processor is configured to access the second node of the linked list in the memory according to the address of the second node.

14. The linked list searching device of claim 11, wherein the linked list further comprises a third node, the third node has a data and a pointer, and the pointer of the second node indicates the address of the third node,
wherein the writing unit is further configured to dividing the data of the third node by the classification factor to obtain a third remainder, wherein the first remainder is different from the second remainder,
wherein when the third remainder is equal to the first remainder, the writing unit is configured to write the data of the third node in the first row of the tag memory, and write the address of the third node in the first row of the data memory,
wherein when the second remainder is equal to the third remainder, the writing unit is configured to write the data of the third node in the second row of the tag memory, and write the address of the third node in the second row of the data memory, and
wherein when the third remainder and the first remainder and the second remainder are different from each other, the writing unit is configured to write the data of the third node in a third row of the tag memory, and write the address of the third node in a third row of the data memory.

15. The linked list searching device of claim 14, wherein when the first remainder is equal to the third remainder, the writing unit is configured to use the data of the third node to overwrite the data of first node on the first row of the tag memory, and use the address of the third node to overwrite the address of the first node on the first row of the data memory.

16. The linked list searching device of claim 14, wherein the writing unit is configured to write the data of the second node in a first set of the second row of the tag memory, and write the address of the second node in a first set of the second row of the data memory, wherein when the third remainder is equal to the second remainder, the writing unit write the data of the third node in a second set of the second row of the tag memory, and write an address of the third node in a second set of the second row of the data memory.

17. The linked list searching device of claim 16, wherein the search unit is configured to compare whether the data of the second node is identical to the first set and the second set of the second row of the tag memory, wherein when the first set of the second row of the tag memory and the data of the second node are identical, the search unit is configured to retrieve the address of the second node from the first set of the second row of the data memory.

18. The linked list searching device of claim 11, wherein the number of rows of the tag memory and the data memory is equal to the value of the classification factor.

19. The linked list searching device of claim 11, wherein the processor is further configured to add a third node to the linked list in the memory, wherein the third node has a data and a pointer, wherein the writing unit is further configured to write the data of the third node in a third row of the tag memory and write the address of the third node in a third row of the data memory.

20. The linked list searching device of claim 11, wherein the processor is further configured to delete the second node from the linked list, wherein the writing unit is further configured to erase the second row of the tag memory and the second row of the data memory.

* * * * *